United States Patent

Gerster

[11] Patent Number: 5,947,425
[45] Date of Patent: Sep. 7, 1999

[54] HOLDING DEVICE FOR PIPES

[75] Inventor: Max Gerster, Winkel, Switzerland

[73] Assignee: Zurecon AG, Zürich, Switzerland

[21] Appl. No.: 08/704,947

[22] Filed: Aug. 29, 1996

[30] Foreign Application Priority Data

Aug. 29, 1995 [CH] Switzerland .......................... 02455/95

[51] Int. Cl.⁶ .................................................. E21F 17/02
[52] U.S. Cl. .............................. 248/58; 248/62; 248/68.1; 248/74.1
[58] Field of Search .................. 248/62, 65, 74.1, 248/74.4, 316.4, 58, 59, 68.1

[56] References Cited

U.S. PATENT DOCUMENTS

| | | | |
|---|---|---|---|
| 2,232,505 | 2/1941 | Abbott | 248/58 |
| 2,291,148 | 7/1942 | Carson | 248/58 |
| 2,750,143 | 6/1956 | Sjoboen | 248/316.4 X |
| 3,734,436 | 5/1973 | Lieberman | 248/58 |
| 4,436,266 | 3/1984 | Gerding | 248/74.1 |
| 4,615,500 | 10/1986 | Layson | 248/62 X |
| 5,007,604 | 4/1991 | Richards | 248/62 |
| 5,192,039 | 3/1993 | Williams | 248/62 |
| 5,422,436 | 6/1995 | Zachrai | 248/56 X |

FOREIGN PATENT DOCUMENTS

| | | | |
|---|---|---|---|
| 3901835 | 7/1989 | Germany | 248/74.1 |
| 673882 | 11/1987 | Switzerland . | |
| 2244087A | 11/1991 | United Kingdom | 248/74.1 |

*Primary Examiner*—Derek J. Berger
*Attorney, Agent, or Firm*—Browdy and Neimark

[57] ABSTRACT

The holding device is intended to allow more rapid, secure and simpler height-adaptable pipe mounting, which is intended to reduce the number of types required up to now for different pipe diameters and to be produced inexpensively. For example, a C- or L-shaped pipe support (10) is essentially designed as a plate, in whose lower area a pipe bed (12) is formed. At least on the side towards the pipe bed (12), the pipe support (10) is designed for the releasable connection with a holding element (6), which can project upwardly, laterally or downwardly. A pipe hold-down (20), which is vertically adjustable for receiving pipes (1) of different diameters, is fixed resting flat against the pipe support (10). The, as a whole very flat, construction of the holding device also allows a perfect heat insulation of the pipe, since no or only narrow gaps are created between successive insulating shells (4) laterally resting against the holder.

14 Claims, 2 Drawing Sheets

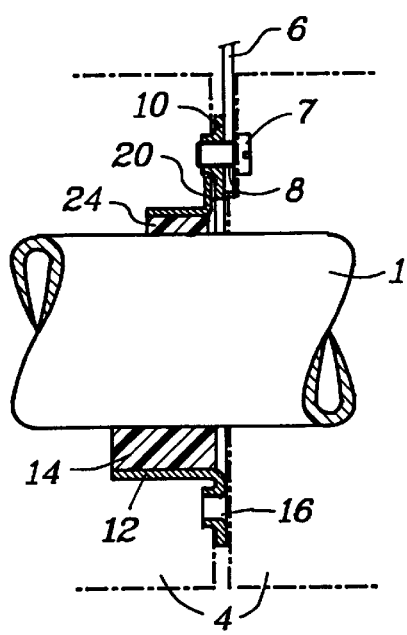
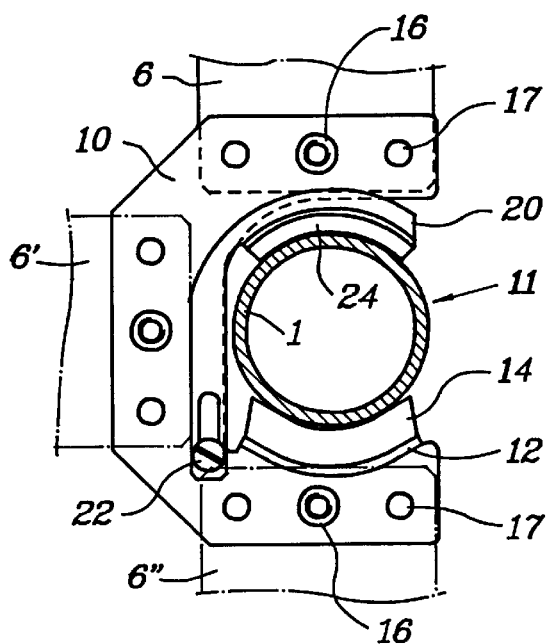
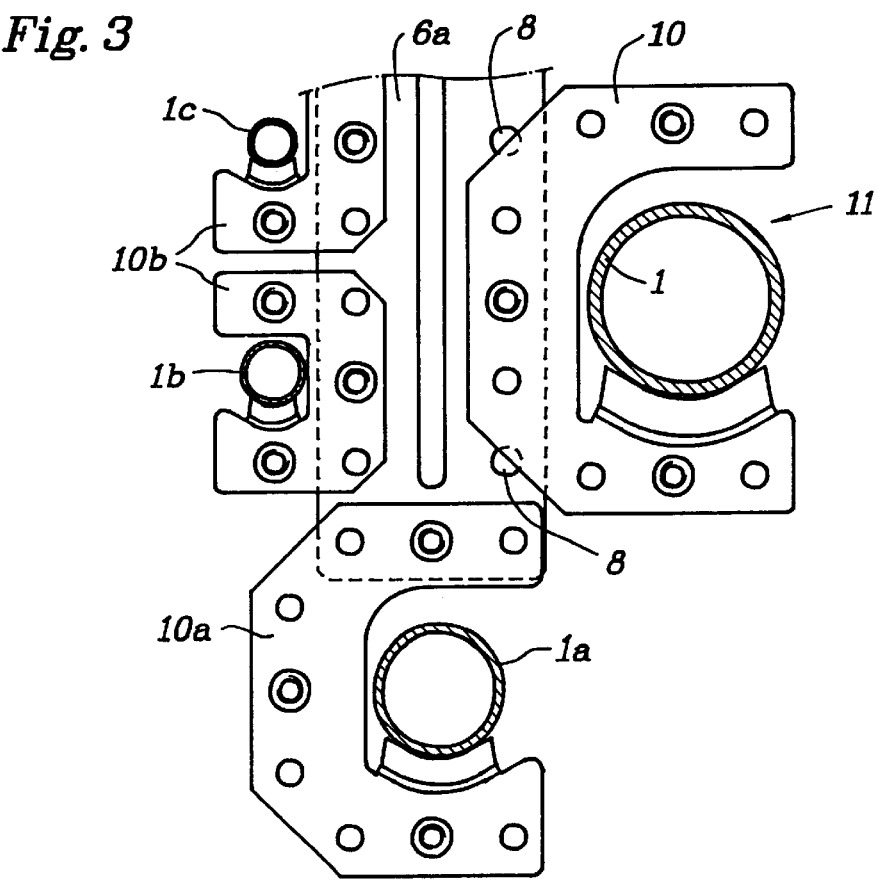

HOLDING DEVICE FOR PIPES

BACKGROUND OF THE INVENTION

1. Technical Field

The invention relates to a holding device for pipes with a pipe support having a lateral insertion opening and with a pipe hold-down which is adjustable in respect to the pipe support.

2. Prior Art

So-called pipe clamps are very much used for the installation of pipelines. They essentially consist of two semicircular straps or half shells which are screwed together into a closed ring extending around the pipe, and of a threaded rod extending away from the one strap (or a threaded tube). By means of the latter the pipe clamp is fastened, as needed, suspended from a ceiling or a support, laterally projecting away from a wall, a support or the like, or in an upright manner. Annular inserts of a rubber-elastic material are used for sound insulation.

In connection with these pipe clamps it is particularly disadvantageous that it is necessary to use ring sizes which are matched to practically every pipe diameter, since the closed, rigid ring hardly permits adaptation to different pipe diameters. The large variety of types required by this results in correspondingly expensive production and in high storage costs. It is furthermore often felt to be disadvantageous in connection with pipe clamps that they do not offer a "temporary" pipe support, particularly with a suspended installation, i.e. the sections of pipe which are mostly several meters long must first be suspended, for example by means of wire loops, until the semicircular straps of all pipe clamps are screwed together. Pipe installation is cumbersome because of this, and can practically only be performed by two craftsmen. It is furthermore disadvantageous that a threaded rod, which must be relatively exactly measured and cut to size, is required for each clamp for spacing the pipe clamps from the ceiling, holder, support or the like for achieving an even slope of the pipes. In this case a later adjustment or leveling of already installed pipes is no longer possible except with a large outlay.

Another type of a pipe holding device in accordance with the species mentioned at the outset is known from Swiss Letters Patent 673,882. There the pipe support, into which the pipe is inserted from the side, is formed of a multi-angled sheet metal strip, which forms a V-shaped pipe support and is connected with a holding rod (threaded rod or tube). Embodiment variants for suspended or upright arrangements of the pipe support are known, i.e. with a holding rod fixedly attached at the top or the bottom. With these devices, the mechanical stress has an unfavorable effect since there is a tendency for bending of the angled sheet metal strip. In addition, the device has a relatively large extension in the direction of the pipe axis, caused by the width of the sheet metal strip. This is disadvantageous in connection with the often required heat insulation of the pipe because correspondingly wide, uninsulated gaps are created between the ends of the insulating shells placed around the pipe.

OBJECT AND SUMMARY OF THE INVENTION

It is the object of the instant invention to remove the disadvantages connected with the known holding devices. It is mainly intended to reduce the multitude of types of pipe clamps for the existing pipe diameters and to make their manufacture and storage less expensive thereby. Also, the use of the holding device in accordance with the invention is intended to be simple and make the pipe installation easier, in that it makes a previous temporary fixation of the pipes unnecessary and simplifies the height adaption.

This object is attained in accordance with the invention in that the pipe support is designed as an essentially flat plate, on which the pipe hold-down can be fixed in place to rest flat against it, and in whose lower area a bed for the pipe is formed, and furthermore, in that the pipe support is designed, at least at the side of the said pipe bed, for the releasable connection with a holding element.

Considerably improved mechanical stress conditions result from the design in accordance with the invention of the pipe support as a flat plate, the flat construction offers advantageous conditions for perfect thermal insulation practically without gaps, or with only short gaps, between the fronts of the insulation shells connected to the device. Thanks to the pipe hold-down, which can be adjusted and fixed in place in respect to the pipe support, one and the same pipe support can receive pipes of different diameters (within a predetermined range) without problems, so that considerably fewer pipe support types result, which can be produced in correspondingly greater amounts. Because of its releasable connection with the holding element, the pipe support always maintains the same position either in suspended, upright or lateral mountings, and it is easily possible to combine different pipe supports with always the same or with different holding elements.

The holding device as a whole consists of only a few individual parts (essentially stamping and bending parts), whose production is possible at low cost. For example, the holding element can consist of a plate- or angle-shaped stamped part provided with round or elongated holes, or can be composed of two perforated plates or angle pieces which are screwed together; the latter can be adjustable telescopically in respect to each other, because of which the leveling of the pipe support or the pipes seated on it becomes particularly simple.

BRIEF DESCRIPTION OF THE DRAWINGS

The invention will be described in more detail below by means of several exemplary embodiments in conjunction with the drawings.

FIG. 1 is a vertical section of the pipe holding device according to the invention, and FIG. 2 a front view of a pipe holding device with a C-shaped pipe support in accordance with a first exemplary embodiment, FIG. 3 shows an example for the arrangement of several pipe supports on a common holding element (the hold-downs are not represented for reasons of simplification)

DETAILED DESCRIPTION OF THE INVENTION

Figure 4:
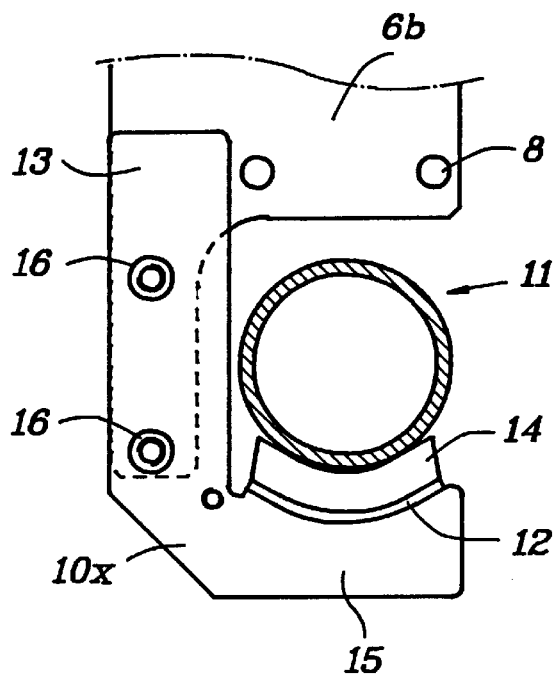
FIGS. 4, 5 and 6 show an L-shaped variant of the pipe support (the hold-down is only represented in FIG. 6), always in the same position, but in respectively different positions of the holding element.

FIGS. 1 and 2 show the first exemplary embodiment of a pipe holding device with the pipe support 10, which is screwed down suspended, for example, from a holding element 6 and on which a pipe hold-down 20 is adjustably fixed for holding the horizontally placed pipe 1. The pipe support 10 essentially is a flat plate stamped out in the shape of a letter C, by means of which the lateral insertion opening 11 for the pipe 1 is formed. A pipe bed 12 in the form of a partial collar is shaped in the lower area of the letter C. As is seen in FIGS. 1 and 2, the partial collar of the pipe bed 12 extends around the pipe circumferentially, forming a portion of a cylinder or tube having a diameter slightly greater than the pipe diameter. The axis of the cylindrical portion is generally coaxial with an axis of the pipe 1 and perpendicular to the flat plate. In the instant example the pipe support 10 is embodied for the releasable connection with the holding element 6 on the side of the pipe bed (located opposite the insertion opening 11) as well as at the top and bottom, in that respectively at the center a collared threaded bore 16 and at both sides of it respectively one stamping 17 are provided. Here the connection with the holding element 6 takes place by means of a screw 7, wherein the associated stampings engage matched bores in the holding element 6. Thus a holding element 6 can be mounted not only at the top, but also, as indicated by dash-dotted lines at 6' and 6" in FIG. 2, projecting toward the side or downward, wherein the pipe support 10 always maintains the position shown (it is of course also possible to hold vertically extending pipes by mounting the holding element and pipe support turned by 90°).

In accordance with FIGS. 1 and 2, the pipe hold-down 20 is embodied as a "gallows-shaped" stamped part. It is fixed, resting flat against one or the other lateral face of the pipe support 10, by means of a screw 22 which engages a corresponding thread in the pipe support. An elongated hole is provided in the vertical leg of the hold-down 20 for height adjustment on the pipe holder, i.e. for adaptation to the various pipe diameters. Since in most cases a sound-absorbing holding of the pipes is required, the pipe bed 12 of the pipe supports as well as the pipe hold-down are usefully each provided with a suitable rubber-elastic layer 14 or 24. These layers can be vulcanized or pushed on, glued, fixed by means of insertable knobs or fastened in another way on the respective metal part. Embodiments without sound-absorbing layers 14 and 24 are of course also possible.

In the course of the pipe installation employing holding devices of the type represented, the pipe supports are screwed in place on the holding elements, which are mounted with suitable spacing at the desired distance from the ceiling, holder, wall, support or the like. The pipe hold-downs can already be mounted on the pipe support (in an initial position which permits receiving the largest pipe diameter), or they can be fixed in place over it only after the insertion of the pipe. In any case, the pipe is received by the pipe bed or pipe supports of all holding devices immediately after it has been inserted through the openings 11, because of which the work is made considerably easier and more secure, because a temporary fastening by means of wires is omitted. Following the fixing of the hold-downs over the pipe by means of screws, it is definitely fixed in place. The embodiment of the pipe support as a flat plate is also particularly advantageous in respect to the static load because of the pipe.

Insulating shells 4, such as are often required for heat insulation of the pipe, are indicated by dash-dotted lines in FIG. 1. As can be seen, a practically uninterrupted and correspondingly effective heat insulation of the pipes is possible thanks to the flat construction of the holding device, because no or only narrow gaps remain between the insulating shells 4 placed around the pipe and laterally adjoining the holding devices; parts extending past the flat plate of the pipe supports, such as the pipe bed, screw heads, etc. can be easily pressed into the porous insulating material of the shells 4.

Many possibilities exist for the design of the holding element 6. For fastening by means of dowels in ceilings or walls, etc., it can be embodied as an angled sheet metal plate or tube- shaped support or, for mounting on perforated profiled pieces, brackets, etc., also as a flat sheet metal plate, in each case of different lengths and, if required, with longitudinal reinforcements, for example in the form of longitudinal beads or beveled edges. Elongated holes and/or an additional, telescopically displaceable plate are very practical for height adjustment or later leveling of the pipes. In place of threaded holes 16 for the releasable mounting of the pipe support 10, it is also possible for stamped and shaped sheet metal hooks to be embodied on it, which engage corresponding holes or slits in the holding element (not shown).

With an installation of groups of pipes with several parallel extending pipes, an arrangement in accordance with FIG. 3 can also be advantageously employed. Here, several pipe supports 10, 10a, 10b of different sizes are fastened at different heights, but always with the pipe bed on the bottom, on a common holding element 6a (for simplification, the pipe hold-downs are not represented in this drawing figure). The holding element 6a is provided with rows of fastening holes 8 at regular distances, which correspond to the distances between the stampings and threads of the various holding elements. As can be seen at the left side of the drawing figure, pipe supports 10b of the same size can of course also receive pipes 1b, 1c of different diameters. By means of this it is made clear that a relatively small number of different types (sizes) of holding devices is sufficient for the multitude of existing pipe diameters. For example, only four different types are required for exterior pipe diameters between 15 mm and 115 mm.

Figure 5:
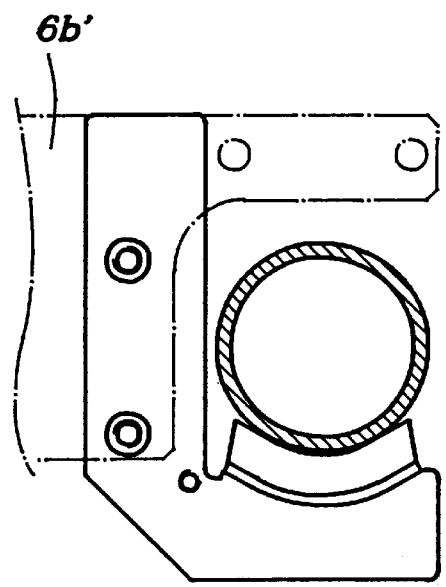
Figure 6:
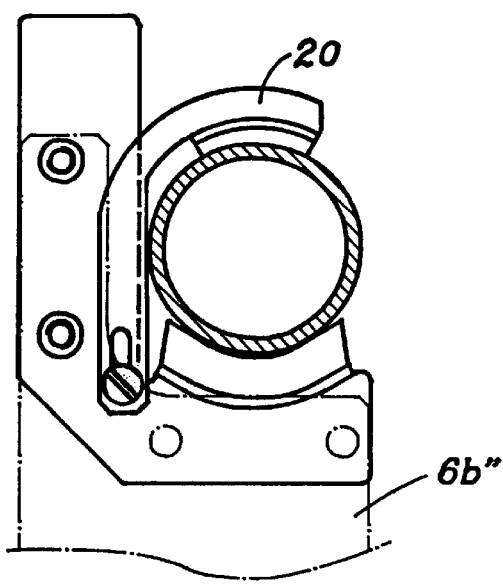

In the exemplary embodiment in accordance with FIGS. 4 to 6 the pipe support 10x is designed differently, namely essentially L-shaped, but still as a flat plate with a pipe bed 12 formed on the lower, horizontal leg 15, and with a sound-absorbing layer 14. For clarity, the pipe hold-down is not represented in FIGS. 4 and 5. It can (in accordance with FIG. 6) be embodied approximately the same as in FIG. 2 or also in different ways. Here, the pipe support 10x is embodied for the connection with a holding element 6b only on the side of the pipe bed 12, i.e. on its vertical leg 13, namely by means of two threaded bores 16. Because the holding element 6b is provided with two pairs of bores 8, which are arranged at even distances and on two lines with are perpendicular in respect to each other, it can be connected, selectively protruding toward the top (6b, FIG. 4), toward the side (6b', FIG. 5) or toward the bottom (6b", FIG. 6), with the pipe support 10x. If elongated holes have been cut in the holding element, it is furthermore possible to fasten the pipe support continuously displaceable on it. It is then possible to perform an exact height adjustment of the pipe axis in a very simple way (without cutting threaded rods or the like to size), whether this takes already place prior to the placement of the pipe or afterwards.

In principle the properties and uses of this variant are the same as in the first exemplary embodiment in accordance with FIGS. 1 and 2. It can also be desired that the fastening point of the holding element on the ceiling, support, bracket, etc. not be located vertically above or below the pipe axis, but be laterally offset (thus as is the case in the example of FIG. 3 in respect to the pipes 1 and 1b, 1c); this can of course be easily achieved by means of an appropriate design of the holding element.

Numerous possibilities exist for the design of an adjustable pipe hold-down. A solution (not shown), which is advantageous in respect to production costs as a whole, consists in that, based on a C-shaped pipe support, the latter is divided in height into two equal (upper and lower) halves. In this case the upper half assumes the function of the pipe hold-down, in that it can be "telescopically" adjusted in relation of the lower (pipe support) half. Here, both halves can be individually fastened on the holding element, wherein the upper (hold-down) half is aligned in a plane with the lower (pipe support) half, or both halves can overlap in the lateral area and can be releasably fastened together on the holding element; in both cases the height adjustment can be performed simply with the aid of elongated holes.

In connection with the represented, sound-absorbent holding of the pipe by means of rubber-elastic layers 14, 24 only in the pipe bed and on the hold-down, the pipe is not enclosed over its entire circumference as in connection with pipe clamps in accordance with the prior art. Among other things, this has the advantage that certain directional deviations of the pipe axis in respect to the holding device (such as often occur in the course of mounting) are easily possible without the sound absorption being hampered by this.

Figure 7:
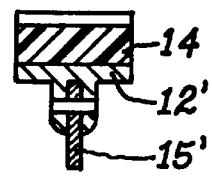
FIG. 7 shows an embodiment variant of the pipe bed in vertical section.

FIG. 7 shows another embodiment of the pipe bed formed in the bottom area of the pipe support 10 or 10x in vertical section. A pipe bed 12', for example embodied as a plastic part and provided with a sound-absorbing layer 14, is mounted "astride" the flat lower leg 15' and secured thereon by means of a pin, rivet, or the like. A corresponding embodiment is of course also possible and practical for the pipe hold-down.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed:

1. A holding device for pipes comprising:
   a pipe support (10) having a lateral insertion opening (11); and
   a pipe hold-down (20), the pipe hold-down being adjustable in respect to the pipe support for various pipe diameters;
   wherein the pipe support (10) is substantially embodied as a flat plate and the pipe hold-down (20) is slidably engaged flat against the pipe support laterally of the pipe support,
   wherein a pipe bed (12, 12') is included on a lower area of the pipe support,
   wherein both the pipe bed (12, 12') and the pipe hold-down (20) are each provided with a sound-absorbing, rubber-elastic layer (14, 24);
   wherein the pipe support (10) has an essentially C-shaped form and has a top, a bottom and a side located opposite the insertion opening (11), and wherein the pipe support further includes a first, a seconds and a third releasable connection adapted to be fixed to the holding element (6) and disposed respectively on the side, the top, and the bottom thereof.

2. The holding device in accordance with claim 1 wherein the essentially C-shaped form of the pipe support (10x) further includes an essentially L-shaped portion including a vertical leg (13), and the vertical leg (13) includes the first, the second, or the third releasable connection whereby the pipe support is adapted to be fixed to the holding element (6).

3. The holding device in accordance with claim 2 wherein the pipe hold-down (20) is embodied as a stamped part resting laterally against the pipe support (10) and wherein a distance of the pipe hold-down (20) from the pipe bed (12) is adjustable.

4. The holding device in accordance with claim 2 wherein the pipe bed (12) is formed in the shape of a partial collar on the pipe support (10).

5. The holding device in accordance with claim 2 wherein the pipe bed (12') is fastened astride the pipe support.

6. The holding device in accordance with claim 1 wherein the pipe hold-down (20) is embodied as a stamped part resting laterally against the pipe support (10) and wherein a distance of the pipe hold-down (20) from the pipe bed (12) is adjustable.

7. The holding device in accordance with claim 6 wherein the pipe bed (12) is formed in the shape of a partial collar on the pipe support (10).

8. The holding device in accordance with claim 1 wherein the pipe bed (12) is formed in the shape of a partial collar on the pipe support (10).

9. The holding device in accordance with claim 1 wherein the pipe bed (12') is fastened astride the pipe support.

10. A pipe holding device for holding a pipe (1) between a pair of insulating shells (4), the pipe having a pipe diameter, said pipe holding device comprising:
    a holding element (6);
    a pipe holder (10) further comprising a substantially flat first plate and a pipe bed (12) shaped as a first partial collar, the first partial collar including a cylindrical portion and a cylindrical portion first axis generally perpendicular to the flat first plate; and
    means for attaching the first plate to the holding element, further comprising:
      a collared threaded bore (16) in the first plate alignable with a matching hole in the holding element, whereby the first plate and the holding element are fastenable by a screw (7); and,
      a stamping (17) in the first plate and a matched bore (8) in the holding element, the stamping and the matched bore being aligned when the collared threaded bore is aligned with the matching hole;
      whereby the holding element and the pipe holder are releasably connected irrotatably by the screw.

11. The pipe holder according to claim 10, wherein the pipe holder comprises;
    a substantially flat second plate comprising a hold-down (20); and
    a device for engaging the hold-down flat against the first plate; wherein
    the hold-down includes a second partial collar, the second partial collar including a second generally cylindrical portion and a cylindrical portion second axis generally perpendicular to the flat second plate.

12. The pipe holder according to claim 10, comprising a rubber-elastic layer (14, 24) on at least one of:

a first surface, of the first generally cylindrical portion, facing a pipe-holding space; and a second surface, of the second generally cylindrical portion, facing a pipe-holding space.

13. The pipe holding device according to claim 10, wherein the holding element comprises at least one row of bores (8), the row of bores comprising the matched bore and the matching hole.

14. The pipe holding device according to claim 13, wherein the bores are disposed at even distances therebetween.

* * * * *